(No Model.) 3 Sheets—Sheet 1.

J. E. FORTIN.
LEATHER MEASURING MACHINE.

No. 514,821. Patented Feb. 13, 1894.

WITNESSES:
Paul Jobst
C. Sedgwick

INVENTOR
J. E. Fortin
BY
Munn & Co
ATTORNEYS.

(No Model.) 3 Sheets—Sheet 2.

J. E. FORTIN.
LEATHER MEASURING MACHINE.

No. 514,821. Patented Feb. 13, 1894.

WITNESSES:
Paul Johot
C. Sedgwick

INVENTOR
J. E. Fortin
BY Munn & Co
ATTORNEYS.

(No Model.) 3 Sheets—Sheet 3.

J. E. FORTIN.
LEATHER MEASURING MACHINE.

No. 514,821. Patented Feb. 13, 1894.

WITNESSES:

INVENTOR

ATTORNEYS.

UNITED STATES PATENT OFFICE.

JULES ERNEST FORTIN, OF QUEBEC, CANADA, ASSIGNOR TO EDMOND PARE AND JOSEPH P. ROY, OF SAME PLACE.

LEATHER-MEASURING MACHINE.

SPECIFICATION forming part of Letters Patent No. 514,821, dated February 13, 1894.

Application filed March 30, 1893. Serial No. 468,249. (No model.)

*To all whom it may concern:*

Be it known that I, JULES ERNEST FORTIN, of Quebec, in the Province of Quebec and Dominion of Canada, have invented a new and Improved Leather-Measuring Machine, of which the following is a full, clear, and exact description.

My invention involves the use of numerous evenly disposed weights which are suspended from a scale, and which by their diplacement affect the scale beam.

The object of my invention is to provide a simple machine embodying this principle, and to arrange the parts so that by raising a side of leather against the suspended weights, and effecting the balance by a counterpoise on the scale beam, the size of the side of leather will be indicated in feet and inches on the beam.

To this end my invention consists in certain features of construction and combination of parts, as will be hereinafter described and claimed.

Reference is to be had to the accompanying drawings forming a part of this specification, in which similar figures of reference indicate corresponding parts in all the views.

Figure 1:
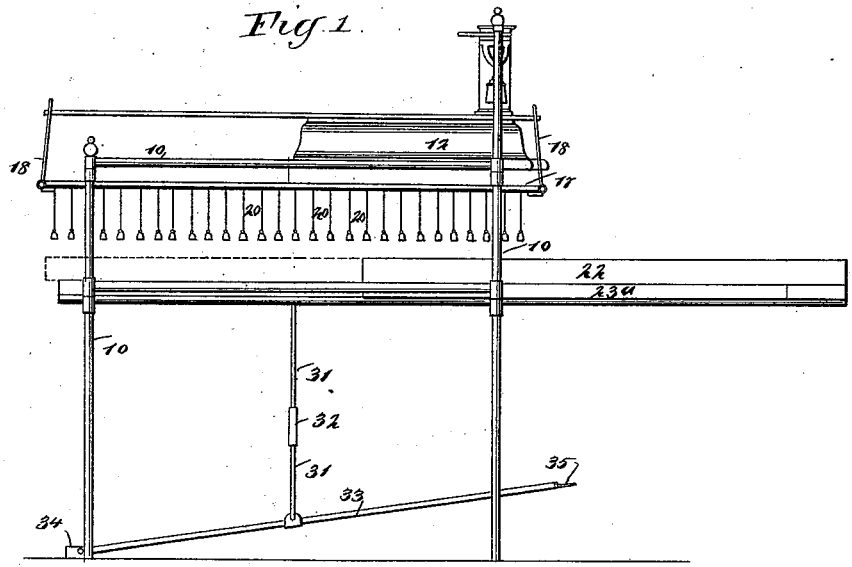
Figure 2:
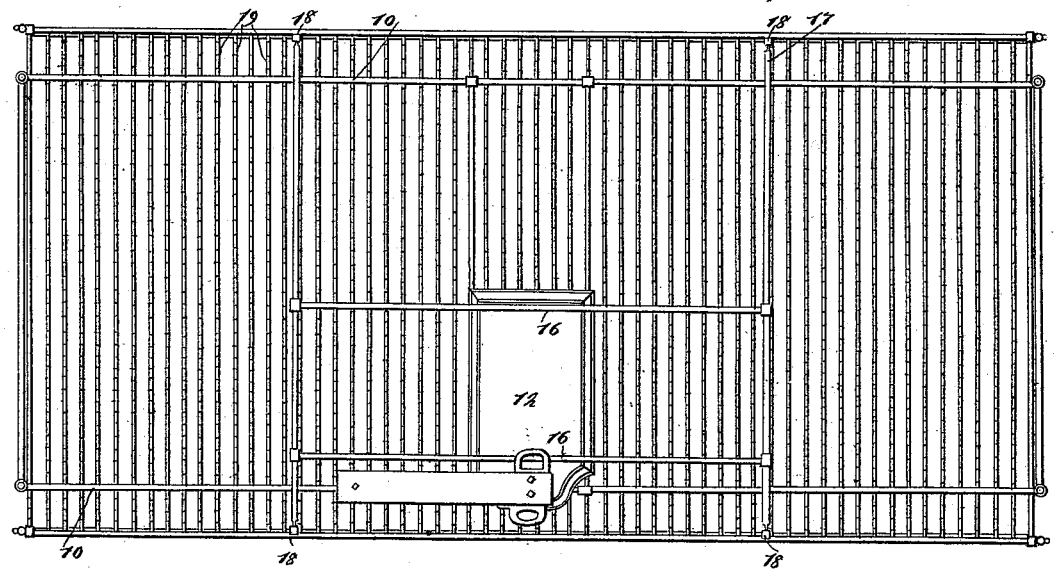
Figure 3:
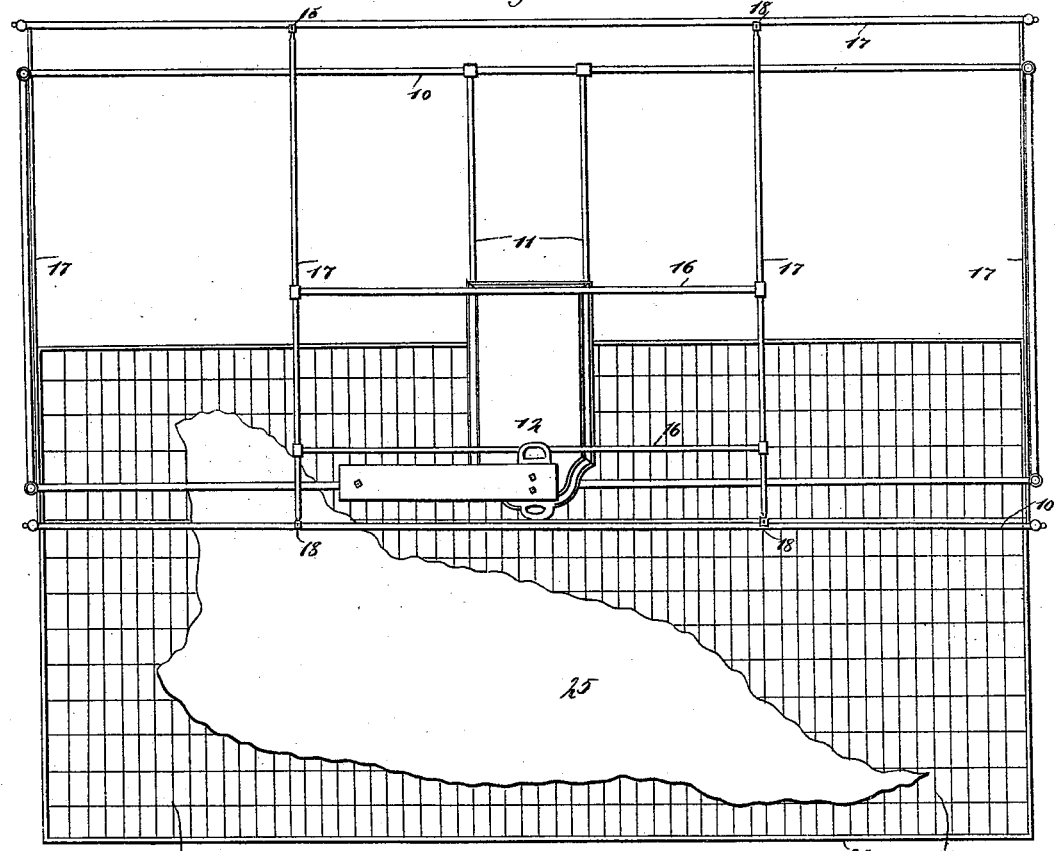
Figure 4:
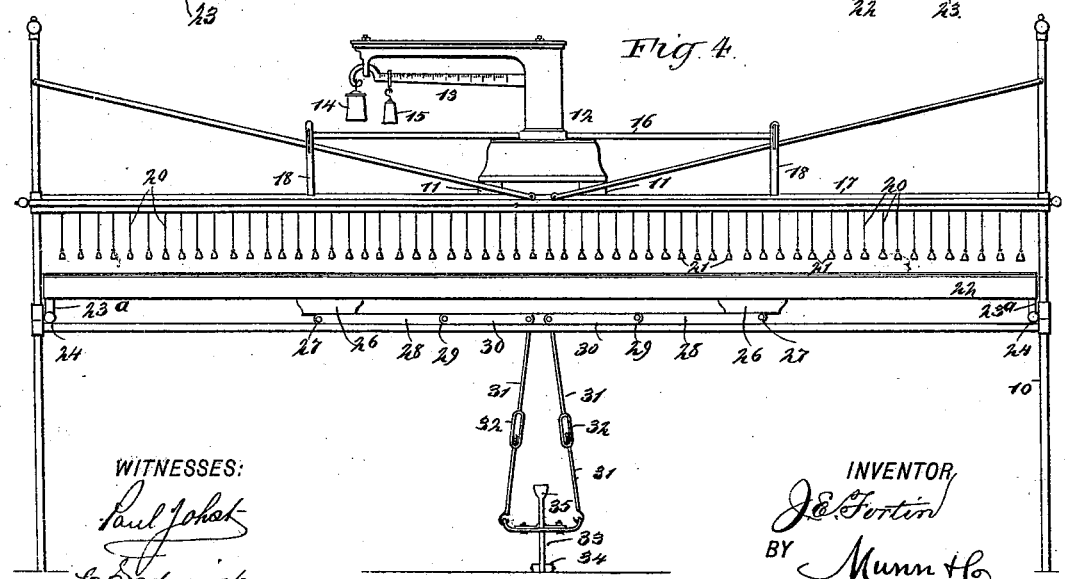
Figure 5:
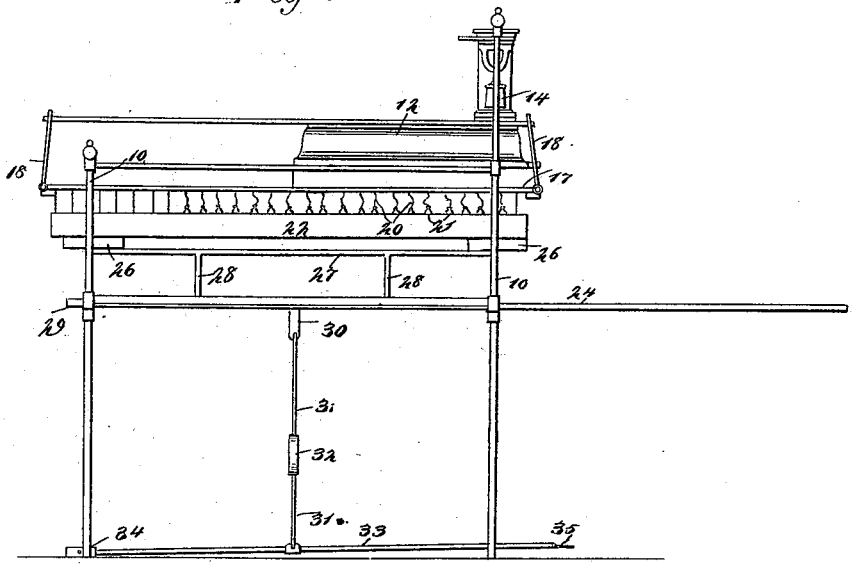
Figure 6:
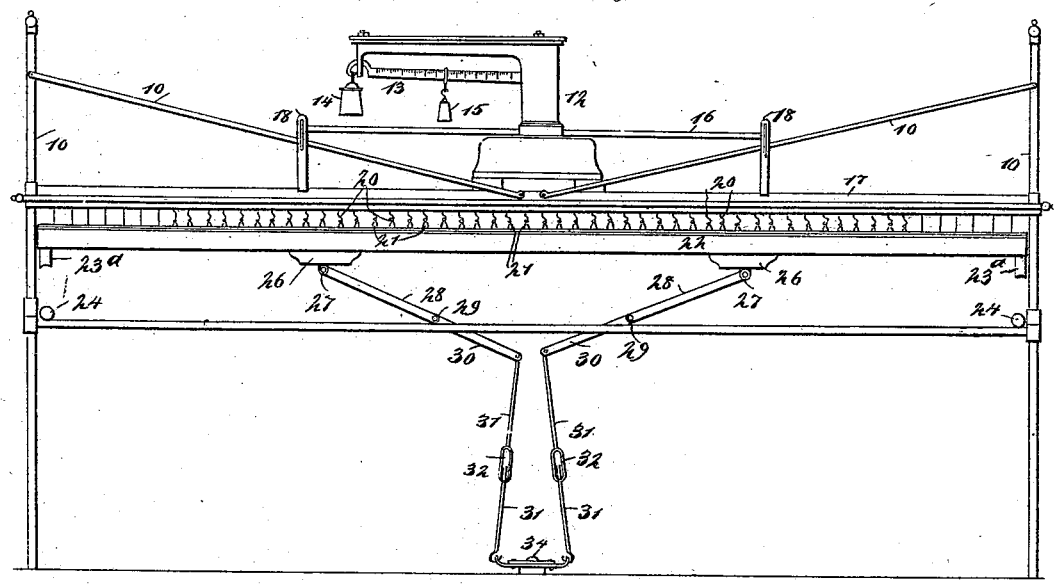

Figure 1 is a side elevation of the machine embodying my invention with the leather-carrying table extended to receive the leather. Fig. 2 is a plan view of the machine. Fig. 3 is a plan view with parts broken away and with the leather table pulled forward to receive the leather. Fig. 4 is a front elevation of the machine with the leather table in its normal position. Fig. 5 is a side elevation of the machine, with the leather table in position for use and raised against the weights above it; and Fig. 6 is a front elevation with the leather table in a raised position.

The machine is provided with a suitable upright frame 10 on the top of which are cross bars 11, these being arranged near the center and extending from the front to the back of the machine, and they support a platform scale 12 of the usual kind, the scale beam 13 of which is marked in feet and inches and is provided, at its free end, with a counterbalance 14 of the right weight to counterbalance the frame and its accessories which are carried by the platform. The scale beam is also provided with the customary counterpoise 15, which is used in ascertaining the weight of the leather and its size, as hereinafter described.

Extending across the platform of the scale are parallel rods 16 which support a rectangular frame 17 and this frame is held between the posts 18 on the main frame 10. Extending across the frame 17, from front to back, is a series of parallel slats 19, and suspended from these slats at frequent intervals are cords 20 to which are attached little weights 21, these being arranged to hang at the same, or approximately the same level. Beneath the little weights and extending horizontally across the main frame is the leather table, comprising a rectangular frame 22 and the cross wires 23, which form the table into a multitude of rectangular openings, each of which is adapted, when the table is in position for use, to register with one of the little weights above it.

The leather table is vertically movable and is also adapted to be pulled out to receive the leather. On the under side of the table, at the ends, are runners 23ª which are held to slide on forwardly projecting tracks 24 which are secured in the main frame and which are preferably tubular. The table may be pulled forward, as shown in Fig. 3, so that a side of leather 25 may be spread upon it, and the table may then be pushed backward into the main frame so that the openings in the table will register with the little weights, as above described. Beneath the table are broad blocks 26 which are actuated by a lever mechanism to be described presently, and which, when lifted against the under side of the table, serve to rest it against the little weights. The blocks 26 are secured to shafts 27 which are carried at the free ends of levers 28, and these are secured to a rock shaft 29 which connects by levers 30 with depending rods 31, these being longitudinally adjustable by means of the ordinary turn buckles 32. The lower ends of the rods 31 are secured to a treadle lever 33 which extends beneath the machine and is pivoted at one end, as shown at 34, while its upper end terminates in a foot plate 35 to which the operator applies pressure when the leather table is to be raised.

The machine is operated in the following way:—The table is pulled out, as shown in Fig. 3, the side of leather 25 is spread upon it, the table is again pushed back and the operator steps upon the treadle 35. This pulls down the free ends of the levers 30, raises the levers 28 and blocks 26, and forces upward the leather table. When the table is forced up, as described, the little weights 21, which do not come opposite the leather, will drop through the openings in the leather table, but the weights which are above the leather will be prevented by the leather from dropping through and will therefore be raised. The balance of the scale, which may be again restored by means of the counterpoise 15 and the position of the counterpoise on the scale beam, will indicate the number of little weights displaced, and consequently the size of the leather. The little weights 21 are hung at regular distances apart and each weight therefore represents a certain space or area; it follows then that the total number of weights displaced represent the size or area of the skin which displaces them, and this total is quickly determined by simply balancing the scales.

Having thus described my invention, I claim as new and desire to secure by Letters Patent—

1. A leather measuring machine, comprising a supporting frame, a platform scale thereon, a frame supported from the platform of the scale, a series of weights flexibly suspended from the frame, and a vertically movable table provided with a series of openings to register with the weights, substantially as described.

2. In a leather measuring machine, the combination with a supporting frame, and a platform scale thereon, of rods extending across the platform of the scale, a frame supported by the said rods, a series of weights flexibly suspended from the said frame, a vertically movable and sliding table provided with a series of openings, and means for raising and lowering the table, substantially as described.

3. In a leather measuring machine, the combination with a scale, and a platform carried by the scale and provided with weights suspended therefrom, of a perforated table, rock shafts below the table, levers secured to the rock shaft and pivotally connected with blocks resting against the under side of the table, a treadle, rods secured to the treadle, and levers secured to the rods and to the rock shaft, substantially as described.

JULES ERNEST FORTIN.

Witnesses:
CHS. MENARD,
MICHEL COTÉ.